July 11, 1961 E. W. BAUER 2,992,415

MAGNETIC CORE PULSE CIRCUITS

Filed Oct. 4, 1956 4 Sheets-Sheet 1

INVENTOR.
EDWIN W. BAUER

BY John E. Dougherty Jr

AGENT

July 11, 1961 E. W. BAUER 2,992,415

MAGNETIC CORE PULSE CIRCUITS

Filed Oct. 4, 1956 4 Sheets-Sheet 2

July 11, 1961 E. W. BAUER 2,992,415

MAGNETIC CORE PULSE CIRCUITS

Filed Oct. 4, 1956 4 Sheets-Sheet 3

July 11, 1961 E. W. BAUER 2,992,415

MAGNETIC CORE PULSE CIRCUITS

Filed Oct. 4, 1956 4 Sheets-Sheet 4

United States Patent Office 2,992,415
Patented July 11, 1961

2,992,415
MAGNETIC CORE PULSE CIRCUITS

Edwin W. Bauer, Poughkeepsie, N.Y., assignor to International Business Machines Corporation, New York, N.Y., a corporation of New York Filed Oct. 4, 1956, Ser. No. 613,952
26 Claims. (Cl. 340—174)

The present invention relates to magnetic circuits and more particularly to magnetic core pulse delay and pulse supplying circuits.

Pulse delay circuits have been found to be particularly useful in digital computers wherein it is often necessary to shift information pulses from one time interval to a succeeding time interval. One particular application of such circuits is found in the arithmetic units of such computers where, in order to perform serial binary addition and multiplication, it is often necessary to feed an output pulse, developed during one time interval by one adding unit, as an input to the same or a different adding unit during the next time interval. Many such delay circuits have been developed, a particular one being shown in the Reissue Patent 23,699, granted August 18, 1953 to Byron L. Havens and assigned to the assignee of the present application. One particular feature of such delay circuits is their ability to develop an output pulse during one time interval in response to an information pulse applied during the preceding interval, and at the same time during said one time interval to accept another information pulse. In circuits having this ability, the output may be fed back as an input and in this manner an information pulse may be stored for a number of time intervals by circulating it in the delay circuit. Delay circuits, as above described, may be generally classified within a broad class of circuits which are capable of producing accurately timed output pulses in response to information pulses. Pulse multiplier and pulse supplying circuits also fall into this broad class since it is their function to supply either one or a plurality of timed output pulses in response to the application of an information signal to their inputs.

A principal object of the present invention is to provide a magnetic core pulse delay circuit.

Another equally important and related object is to provide pulse multiplier and pulse supplying circuits which utilize magnetic elements in producing either a single timed output pulse or a plurality of discrete output pulses in response to an input pulse applied thereto.

These objects are achieved by providing a magnetic core element which is driven by quantified pulses. An inherent feature of a toroidal magnetic core is the fact that it may be considered to comprise a plurality of individual concentric parallel flux paths. Each of these paths has a different length, the path adjacent the inner circumference of the core having, of course, the shortest length and the path adjacent the outer path having the greatest length. When a magnetomotive force is applied to such a core by energizing a winding embracing the entire cross section of the core, each of these flux paths is subjected to a magnetic field of different intensity. Since the flux changes effected in any one path are dependent upon the intensity of the magnetic field applied to that path, it becomes apparent that the flux changes effected in the different paths, having different lengths, vary. This variance applies to both the magnitude and time of the flux changes and it is possible to apply to such a core a quantified pulse which is effective to cause the flux in the different paths to be reversed during succeeding time intervals. By positioning openings in the core and threading output windings through these openings to embrace different ones of the flux paths, a plurality of discrete output pulses, each occurring during the time increment in which the linked path is switched, may be manifested. In accordance with this principle a pulse multiplier circuit is constructed wherein a plurality of output windings are positioned through openings in the core material to embrace the successively longer flux paths. Each output winding manifests an output pulse when the flux in the particular flux path which it embraces is switched and, since the switching, upon the application of a quantified drive pulse, occurs during succeeding time intervals, the output windings may be fed through an OR circuit to a single output terminal at which a train of discrete output pulses are manifested. The number and timing of output pulses may be varied by initially applying a quantified pulse to the core which is effective to reverse the flux direction in only particular ones of the flux paths. In such a case, the magnetomotive force applied when the drive winding is energized may be of a polarity to switch only the paths which have been initially reversed and outputs are developed only on the windings linking these paths. Another method of controlling the number and timing of the output pulses produced, which may be utilized either independently or in connection with the method described above, is to connect the output OR circuit to a gating circuit which is under control of a further output or gating winding which embraces a portion of the core material including any one or ones of the flux paths. The gate will thus be opened only during the interval during which the paths included in the portion embraced by the gating winding are switched and only those pulses developed on output windings embracing those paths are passed through the gate.

In accordance with a further embodiment of the invention, a delay circuit is provided in which inputs, applied by a drive winding, are effective to cause the flux in the entire core to be oriented in one direction. A quantified clock pulse is then applied to the core, which pulse is effective to reverse the flux throughout the core in a particular period of time. An output winding is provided which is positioned through an opening in the core to embrace only the outer flux path of the core, which path is switched a predetermined time after the quantified clock pulse is first applied. The output winding is connected to a thyratron amplifier and the amplifier, when rendered conductive in response to a pulse developed on the output winding, produces an output during the next succeeding time interval after the application of the initial input pulse to the core. Provision is also made to feed this output pulse back as an input to the magnetic element so that an information pulse may be circulated in the delay circuit for any desired number of time intervals.

Thus, a further object of the invention becomes that of providing a pulsing circuit which utilizes a magnetic element having a plurality paths, each linked by individual output windings, to produce a plurality of discrete pulses in response to the application of an input signal to the element.

A further object is to provide a pulsing circuit of this type in which the number and timing of the output pulses produced at a particular junction may be controlled by a further output winding linking at least a portion of the magnetic core.

A further object is to provide a pulsing circuit of this type wherein the number and timing of the output pulses produced may be controlled by means effective to cause the flux in certain of the flux paths to be oriented in one direction while the flux in certain other paths remains oriented in the opposite direction.

A further object is to provide a magnetic core pulse delay circuit capable of receiving input pulses during each of a plurality of succeeding time intervals and manifesting an output pulse in response to each input pulse during the next succeeding time interval after the application of the input pulse.

Other objects of the invention will be pointed out in the following description and claims and illustrated in the accompanying drawings, which disclose, by way of example, the principle of the invention and the best mode, which has been contemplated, of applying the principle.

Figure 1:
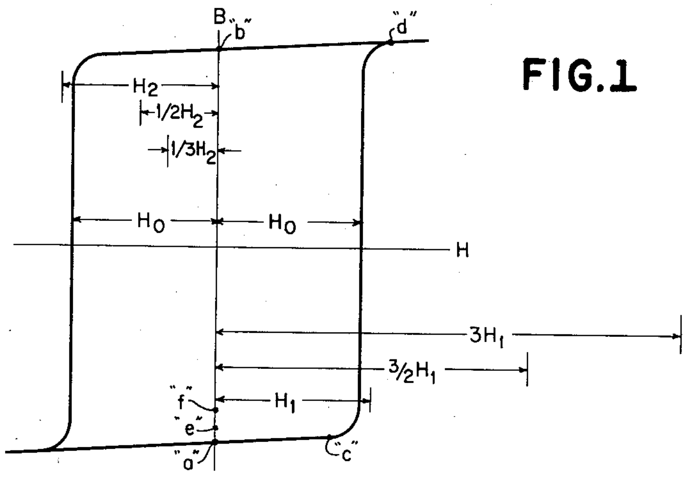
FIG. 1 is a plot of flux density versus magnetic field intensity for a magnetic material such as might be used in magnetic core elements incorporated in circuits operated in accordance with the principles of the present invention.
Figure 1A:
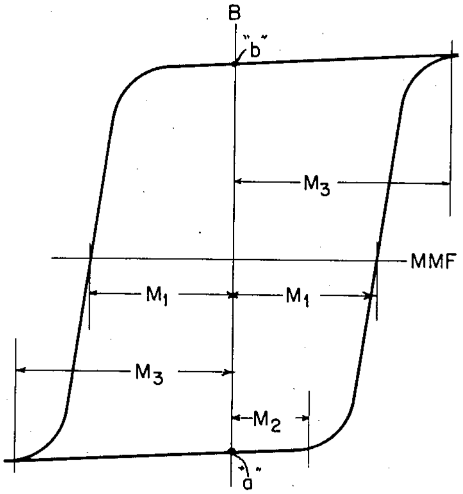
FIG. 1A is a plot of flux density versus magnetomotive force for a core of magnetic material.
Figure 2:
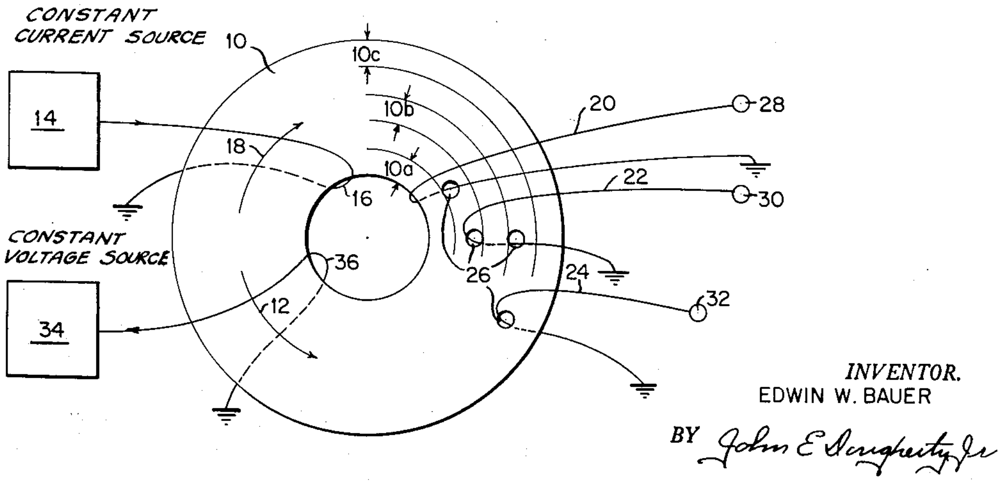
FIG. 2 is a diagrammatic showing of one circuit embodying the present invention.

Referring now to FIG. 1, there is shown a hysteresis loop illustrating the typical relationship between flux density (B) and magnetic field intensity (H) for a core of ferromagnetic material. Such a core, designated 10, is shown in FIG. 2. Though the hysteresis loop shown is useful in indicating this relationship, and also in explaining switching phenomena which occur in a variety of magnetic circuits, it should be borne in mind that a loop depicting the relationship between flux density (B) and magnetic field intensity (H) actually represents a characteristic of the ferromagnetic material. This is so, since magnetic field intensity, H, is expressed in magnetomotive force per unit of length and flux density, B, is expressed in webers per unit of cross sectional area. A plot representing the switching characteristics for a particular core of magnetic material is preferably in the form shown in FIG. 1A, wherein the abscissa represents the total magnetomotive force applied to the core. Such plots are only entirely accurate with respect to the particular energizing signals utilized in obtaining them. This is so since the actual switching characteristic for a particular magnetic material is actually a function, not only of the magnitude of applied magnetizing force, but also of the length of time it is applied. Referring to FIG. 1, the intensity of the magnetic field necessary to switch the flux in a portion of magnetic material, initially in the remanent condition indicated by *a*, is represented at $H_0$. This value is known as the threshold magnetic field intensity, and where a field less than this is applied, the material, upon termination of the applied field, reassumes the initial remanent state at *a*. Similarly, where the material is initially in the remanent state *b*, an applied magnetic field, in intensity less than $H_0$, is not effective to switch the direction of magnetization in the magnetic material. When, with the material in either state of remanence, a magnetic field in intensity greater $H_0$ is applied in the proper direction to reverse the direction of magnetization in the material, the magnetization will begin to be switched. For example, with the material initially at remanence at *a*, the application of a positive magnetic field of sufficient intensity, the word positive indicating only direction, is effective to cause the loop to be traversed from *a* through *c* and thence up the vertical portion of the loop. Where the magnetic field intensity is in excess of the threshold intensity, the amount of switching, which occurs in a finite portion of magnetic material, depends both on the magnitude of the magnetic field and the duration of its application. Thus, an applied magnetic field of high intensity is effective to reverse the direction of magnetization in a portion of magnetic material in a shorter time than a magnetic field of lower intensity. The minimum magnetomotive force required to reduce the flux density in a core of magnetic material to zero is usually termed the coercive magnetomotive force for the core and is indicated in FIG. 1A at $M_1$. It should be noted that the loop of 1A is not as square as that of FIG. 1. This is due to the aforementioned time dependence of the switching phenomenon resulting from the fact that core 10 actually comprises a plurality of different length flux paths which, when the entire core is subjected to a magnetomotive force, are each subjected to a magnetic field of different intensity. The magnetomotive force necessary to initiate switching in the core, which is the magnetomotive force required to cause the shortest length flux path to be subjected to a magnetic field intensity greater than $H_0$, is indicated at $M_2$ in FIG. 1A. This force is usually termed the threshold force for the core. The force necessary to switch the entire core, that is, the force required to cause the longest flux to be subjected to a field in intensity greater than $H_0$, is indicated at $M_3$ in FIG. 1A.

These principles are illustrated in the description, now to be given, of the manner in which the magnetic flux in different portions of the core 10 of FIG. 2 is caused to be switched from one direction to the other when a magnetomotive force is applied to a winding embracing the entire cross sectional area of the core. First, let it be assumed that all of the magnetic material in core 10 is in a remanent state of magnetism in the counterclockwise direction, as indicated by arrow 12, and that this state is the remanent state indicated at *a* in FIG. 1. If, with the core material in this state, a positive pulse is applied by a pulse source 14 to a winding 16 which embraces the core 10, the direction of current flow is as indicated by the arrow on winding 16. This is the proper direction of current flow to apply a magnetomotive force tending to reverse the direction of magnetization in the core material to the clockwise direction indicated by the arrow 18. The total magnetomotive force applied is a function of the current flow through the winding and the number of turns with which it embraces the core 10. Core 10 may be considered to be made of a plurality of circumferentially extending parallel flux paths of varying length, the shortest path being along the inner circumference of the core material and the longest being along the outer circumference of the core material. Since, as noted above, the magnetic field intensity (H) is the magnetomotive force per unit of length, each of the successively longer paths, extending from the inner to outer circumference of the core, are initially subjected to different magnetizing forces. Thus, if we consider the three bands, designated 10*a*, 10*b* and 10*c* in FIG. 2, to be representative of the plurality of varying length parallel flux paths existing in the core, and further assume that the length of path 10*a* is one-half of that of path 10*b* and one-third of that of path 10*c*, then the intensity of the magnetic field initially applied to path 10*a* is twice that initially applied to path 10*b*, and three times that initially applied to path 10*c*. Each of the paths 10*a*, 10*b* and 10*c* are, of course, made of a number of smaller paths of varying length but, for the purpose of illustration, each is here considered to constitute a single closed path. Now, if the pulses applied by winding 16 are of sufficient magnitude to cause to be applied to the outer path 10*c* a magnetic field of intensity $H_1$, which, as indicated in FIG. 1, is greater than the threshold field intensity for the material, the other paths 10*b* and 10*a* are subjected to magnetic fields of $3/2H_1$, and $3H_1$ respectively. As has been pointed out above, the time which it takes to switch a particular portion of magnetic material is dependent upon the magnitude of the magnetic field intensity applied. The path 10*a* is switched relatively fast since the intensity of the field applied thereto is appreciably larger than the coercive field for the material. Similarly, the path 10b is switched fast but not as fast as path 10a and, finally, path 10c, which is subjected to a magnetic field intensity only slightly in excess of the threshold field $H_0$, is switched at a slower rate. Thus, where such a pulse is applied by winding 16 and maintained for a sufficient time to allow the flux in the outer path to be completely reversed, the switching in the different paths is accomplished during succeeding time intervals.

Figure 2A:
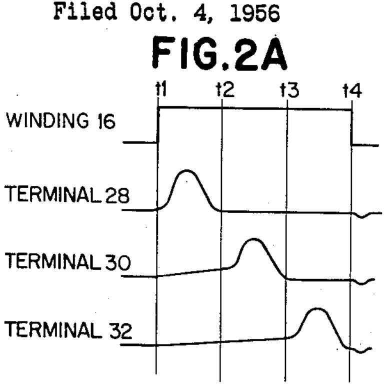
FIGS. 2A and 2B are timing diagrams for the circuit of FIG. 2.

Three output windings designated 20, 22 and 24 are positioned through holes 26 pierced in core 10, so that each winding embraces one of the flux paths 10a, 10b, and 10c. The outputs on these windings are manifested at terminals 28, 30 and 32 and, as is indicated in the timing chart of FIG. 2A, the outputs occur in different time intervals. When, with the core 10 initially in the remanent state *a* of FIG. 1, a pulse is applied at a time *t*1 by pulse source 14 to winding 16 to subject paths 10a, 10b and 10c to magnetic field intensities of $3H_1$, $3/2H_1$ and $H_1$, respectively, a pulse is developed on winding 20, which links only the path 10a, from time *t*1 to time *t*2. Similarly, a pulse is developed on winding 22, which embraces path 10b, from *t*2 to *t*3 time and a pulse on winding 24, which winding embraces path 10c, from *t*3 to *t*4 time. As is indicated in FIG. 2A, some switching occurs in paths 10b and 10c causing a small output to be developed on windings 22 and 24 immediately after the application of the pulse to winding 16. The vertical portion of the hysteresis loop for the magnetic material in path 10b is traversed during a second time interval and for the magnetic material in path 10c during a third time interval. As a result, a relatively large output pulse is developed and manifested at terminal 30 during the second time interval and a similar pulse is developed and manifested at terminal 32 during the third time interval.

Figure 2B:
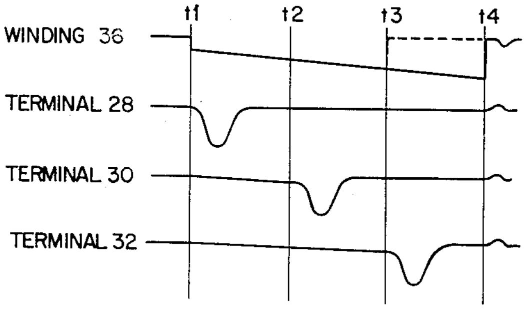

A second pulse source 34 is provided to drive a second drive winding 36 which embraces the entire cross section of FIG. 2. Upon the termination of a pulse applied to winding 16 which is effective to reverse the direction of flux in the entire core, each of the three paths assumes the remanent condition in the clockwise direction indicated at *b* in FIG. 1. Thus, the subsequent application by signal source 34 to winding 36, of a pulse of a polarity to cause current to flow in the direction indicated by the arrow on the winding, causes the core 10 to be subjected to a counterclockwise magnetomotive force which tends to switch the direction of flux in the core. The signal sources 14 and 34 differ in that source 14 is effective to apply constant current pulses to winding 18, whereas the signal source 34 is effective to apply constant voltage pulses to winding 36. Since the magnetomotive force applied to the core, when either winding is energized, is proportional to the current flowing through the winding, the pulse forms for windings 16 and 36, shown in FIGS. 2A and 2B represent the current flow through these windings. Thus, where the core is current driven, that is, where a constant current pulse is applied to winding 14 the operation is as described above, whereas the operation, when a constant voltage pulse is applied to winding 36, is different as will appear in the description about to be given.

The characteristics of constant voltage signal source 34 are such that, when all of the material in core 10 is in the counterclockwise remanent condition indicated at *b* in FIG. 1, a voltage pulse supplied by source 34 causes current to flow in winding 36 in the direction shown by the arrow on the winding, which current is of sufficient magnitude to cause the inner path 10a to be subjected to a magnetic field intensity greater than the threshold field intensity for the material. This field intensity is indicated at $H_2$ in FIG. 1, and, because of their greater lengths, paths 10b and 10c are initially subjected to the fields of intensity $1/2H_2$ and $1/3H_2$, respectively. These latter fields of less than the threshold intensity are insufficient to switch paths 10b and 10c and initially only path 10a is switched causing the output pulse shown to be developed during time interval *t*1 to *t*2. However, as the magnetic material in the inner portion of the core is switched the total reluctance of the core is increased thereby decreasing the inductive impedance offered by winding 36 to the signal applied by source 34. Since source 34 supplies a constant voltage signal, the current flowing through winding 36 is determined principally by the impedance of this winding. As a result, the current in winding 36 increases as the successive circular paths are switched, causing the intensity of the magnetic fields applied to paths 10b and 10c to exceed the threshold intensity during time interval *t*2 to *t*3 and *t*3 to *t*4, respectively. The magnetic flux in these paths are switched during these time intervals causing the output pulses shown to be developed at terminals 30 and 32.

Thus, it is shown that it is possible to develop a plurality of output pulses at different time intervals when a single input pulse is applied to one of the drive windings 16 or 36. Secondly, it should be noted that a chain of pulses may be developed with either a constant voltage or constant current pulse being applied to the drive windings and that, by positioning the output windings to embrace different portions of the core material, the duration and spacing of the output pulses may be varied. Further, note should be made of the fact that, by applying properly quantified drive pulses, selected portions of the core can be switched. Thus, where a constant current pulse is supplied, the magnitude of the pulse may be chosen so that the threshold intensity is exceeded only for path 10a. In such a case, regardless of the duration of the drive pulse, the flux in paths 10b and 10c will not be reversed. When a constant voltage pulse is supplied, the pulse duration and amplitude is controlling as to which portions of the core are switched. If, for example, the pulse applied by source 34 is cut off at time *t*3, as is indicated by the dotted representation in FIG. 2B, the flux in path 10c is not reversed and output pulses are developed only at terminals 28 and 30. In such cases the paths, for which the threshold intensity is not exceeded, revert to their original condition of remanence when the energizing pulse is terminated.

The paths which are to be switched may also be controlled by controlling the duration of a constant current pulse. This is indicated in FIG. 2A where it can be seen that paths 10b and 10c are reversed during succeeding time intervals. However, where a constant current pulse of sufficient magnitude to cause the outer flux 10c to be subjected to a field in intensity greater than the threshold intensity, is terminated before it is effective to switch the flux throughout the core, there is some switching accomplished in each path since all are subjected to a field having an intensity in excess of the threshold intensity $H_0$, and, upon termination of the drive pulse, these paths will not reassume the initial state of remanence. For example, for the constant current operation described above with reference to FIGS. 2 and 2A, the magnetic field intensities $H_1$ and $3/2H_1$, which are applied to paths 10c and 10b, respectively, are, as shown, ineffective to switch the flux in these paths during the first time interval. Thus, if the energizing pulse applied to winding 16 is terminated at *t*2 time, paths 10b and 10c are not switched completely and no output pulses are developed at terminals 30 and 32. However, since the applied magnetomotive force is sufficient to cause the threshold intensity to be exceeded in paths 10b and 10c, some magnetic domains are completely reversed in each of these paths before *t*2 time and, upon termination of the drive pulse, these paths assume remanent states such as are indicated at *e* and *f* in FIG. 1.

The circuit of FIG. 2 may, of course, be operated with two constant current drive windings or a single drive winding energized by an alternating signal of either type. Outputs may be developed in response to switching the flux in the core in either direction, or, by placing diodes in the output circuit, outputs may be developed only in response to switching in one direction. In the latter case, one of the windings may be considered as a reset or information input winding and the other a readout winding which is effective to produce output pulses only when the first winding has initially been energized to establish the flux in the core in a direction opposite to the direction of the field established when the reset winding is energized.

Figure 3:
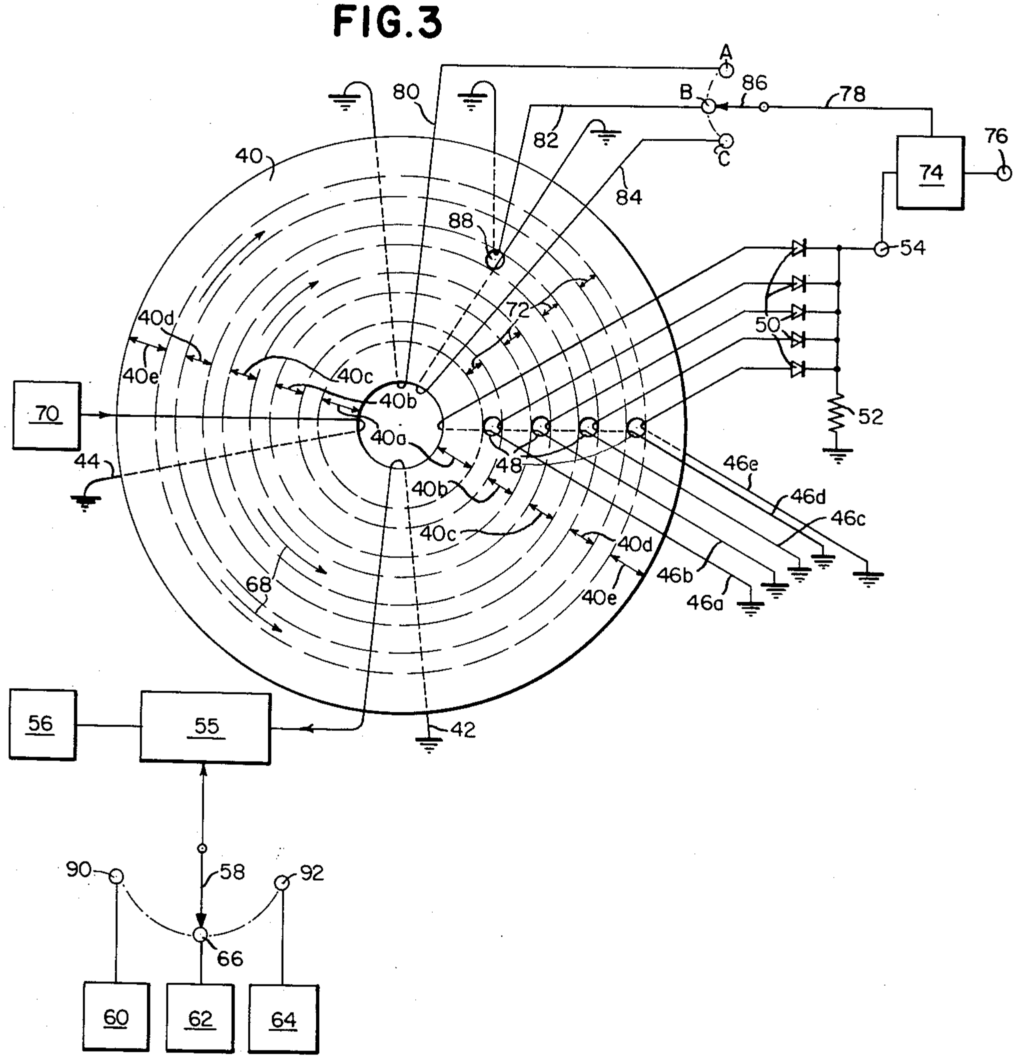
FIG. 3 is a diagrammatic showing of further circuitry embodying the principles of the invention.

FIG. 3 shows a pulse multiplier controllable to provide various combinations of output pulses. The basic switching element of the circuit is a core 40 which is linked by a pair of drive windings 42 and 44 and a plurality of output windings **46*a*, 46*b*, 46*c*, 46*d* and 46*e*. A plurality of openings 48 are positioned through the core material to divide the core into five circular flux paths 40*a*, 40*b*, 40*c*, 40*d* and 40*e*. Output windings 46*a* through 46*e* are threaded through openings 48 so that each winding embraces one, and only one, of the flux paths. Each output winding is connected through a corresponding one to a plurality of diodes 50 to a resistor 52 which is connected to ground. The diodes 50 and resistor 52 form an OR circuit capable of allowing the outputs of one polarity, developed on each of the output windings, to be manifested at a single terminal 54**.

Figure 3B:
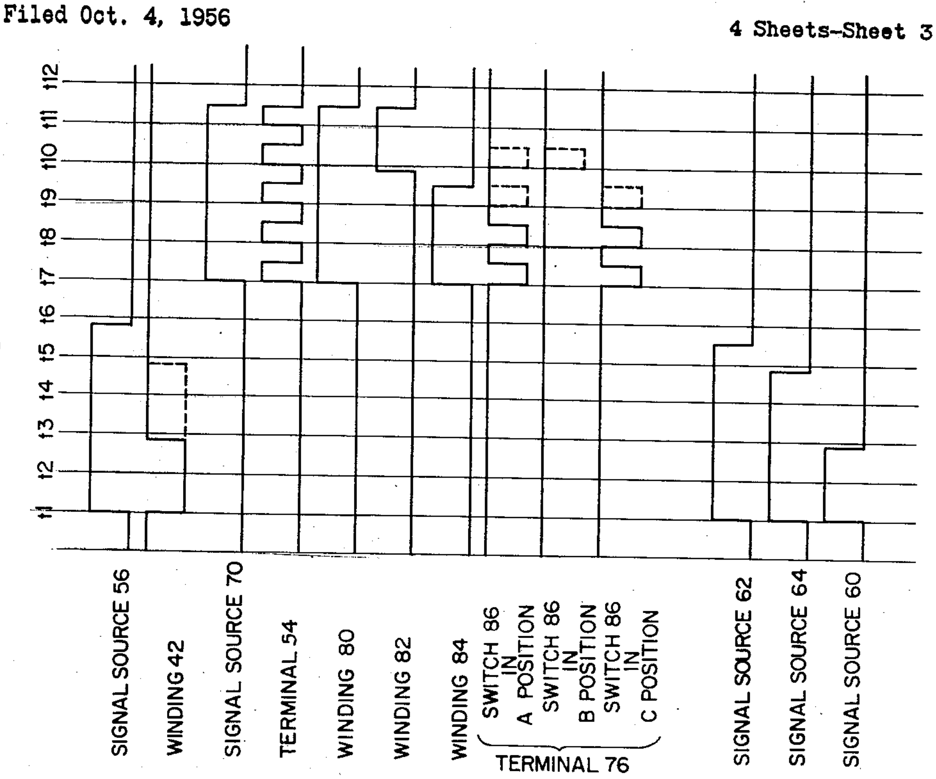
FIGS. 3A and 3B are timing diagrams for the circuit of FIG. 3.
Figure 3A:
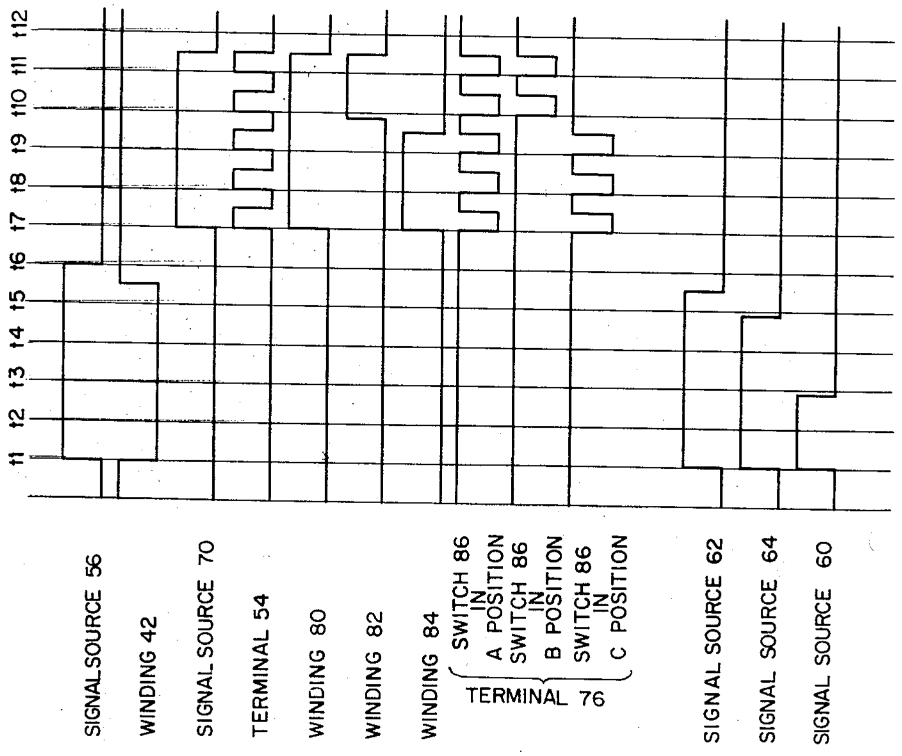

Operation of the circuit of FIG. 3 may be initiated by the application of an energizing pulse to winding 42. Signals are applied to winding 42, through a gate 55, by a signal source 56. Gate 55 may be opened under the control of switch 58 by signals from any one of three pulse sources 60, 62 or 64. With switch 58 in the position shown contacting terminal 66, gate 55 is under the control of signal source 62. The pulses supplied by the various signal sources are illustrated in FIG. 3A, and, as there shown, signal source 56 is effective to apply a signal to gate 55 from a time *t1* to *t6*. Signal source 62 also supplies a signal at *t1* time which signal is effective to open gate 55 and maintain it opened until shortly before *t6* time. Winding 42 is thus energized and maintained energized for approximately five and one-half of the time intervals shown and the amplitude of the applied signal is such that it is just sufficient, when applied during this time, to reverse the flux direction in all of the flux paths **40*a* through 40*e* in the core 40. The current flow through winding 42 is in the direction indicated by the arrow on that winding and causes a magnetomotive force, in the direction of arrows 68, to be applied to the core. Regardless of the initial state of the core, the flux in each of the flux paths, upon termination of the above described pulse to winding 42**, is in a remanent condition in the counterclockwise direction which condition, for the core material, is indicated by a letter *b* in FIG. 1. With the flux in the entire core material in this remanent condition in the counterclockwise condition, a signal source 70 is effective to apply to winding 44 a pulse of a polarity to reverse the direction of flux in the core. As shown in FIG. 3A, the signal supplied by source 70 is initiated at time *t7* and is maintained for approximately four and one-half time intervals. The amplitude of the pulse applied to winding 44 is such that, in the time interval of its application, the pulse is just sufficient to reverse the flux direction in the entire core and, thus, in each of the paths **40*a* through 40*e***.

As has been pointed out in the discussion above of FIGS. 2, 2A and 2B, when such a driving pulse is applied to the core, whether it be a constant current pulse or a constant voltage pulse, the various circular parallel flux paths in the core are switched during succeeding time intervals. The output windings **46*a* through 46*e* each link one of the five flux paths into which the core material is divided by the openings 48. The successive flux paths are separated by similar circular portions of the core material designated 72. As a result the pulses developed successively on windings 46*a*, 46*b*, 46*c*, 46*d* and 46*e* are separated in time and, being of the proper polarity to pass through diodes 50, appear at terminal 54** as five discrete pulses occurring as shown in FIG. 3A during five successive time intervals beginning at time *t7*. Since the theory of operation has been described in detail with reference to FIGS. 2, 2A and 2B, all of the pulse forms of FIG. 3A are shown idealized as square pulses in order that the time sequence, especially with relation to the gating circuits about to be described, might be more graphically illustrated.

Terminal 54 is connected through a gate 74 to an output terminal 76. Gate 74 is normally closed but may be opened by applying signals to a lead 78 to allow pulses developed at terminal 54 to be transmitted to terminal 76. Gate 74 may be controlled by any one of three output windings 80, 82 and 84 which link different portions of core 40. Winding 80 embraces the entire cross section of the core and, when a switch 86 is transferred to its A position, a gating pulse is applied to lead 78 during the entire core switching time. When, with each of the flux paths **40*a* through 40*e* in the remanent condition in a counterclockwise direction, a drive pulse is applied by signal source 70 to winding 44** at *t7* time, an output is developed on winding 80 beginning at *t7* time and extending for approximately four and one-half intervals. Gate 74 is thus opened and held open so that each of the five discrete pulses developed at terminal 54 are transmitted to terminal 76.

Winding 82 is positioned through an opening 88 in the core material so that it embraces flux paths **40*d* and 40*e* as well as the portion of magnetic material 72 between these two paths. Thus, when under the conditions above described a drive pulse is applied to winding 44 with switch 86 in the B position, gate 74** is opened only from *t10* time until the core is entirely switched at half past time *t11*. As a result, as is shown in FIG. 3A, only the last two of the five discrete pulses developed at terminal 54 are manifested at terminal 76. The third winding 84 is positioned through opening 88 to embrace flux paths **10*a*, 10*b* and 10*c* as well as the portions 72 separating these paths. When winding 44 is energized, as above, with switch 86 in the C position, gate 74** is opened from *t7* time to shortly before *t10* time to allow the first three discrete pulses developed at terminal 54 to pass through the gate to terminal 76. It should be noted that each of the windings 80, 82 and 84 embrace a continuous portion of the core material, that is certain of the paths **10*a* through 10*e*** as well as portions between these paths. Thus the pulses developed on these windings are continuous, beginning when the innermost portion of the core material linked by the particular winding is switched and extending in time until the outermost portion linked by the winding is switched.

From the above description it may be seen that the pulse multiplier of FIG. 3, when addressed with a single drive pulse, is capable of providing a plurality of output pulses, the number and timing of which may be controlled by setting switch 86. It is of course possible to divide the core into different numbers of flux paths and thereby provide more or less pulse output windings than shown in FIG. 3 and the number, spacing and timing of the output pulses may be varied in any manner desired by providing gating windings such as 80, 82 and 84 which link different portions of the core material and which may be connected to control one or a plurality of gates to which outputs developed on the other windings are applied.

It is also possible to control the number and sequence of outputs by controlling the pulses applied to winding 42. In the mode of operation above described all of the flux paths in core 40 are initially caused to assume the counterclockwise remanent condition. However, by applying quantified pulses, the core can be caused to assume a state where certain of the flux paths are in the counterclockwise remanent condition and the other paths are in the opposite direction. This type of operation may be illustrated with reference to the timing diagram of FIG. 3B. When switch 58 is transferred to contact terminal 90, gate 55 is placed under the control of signal source 60. As shown in FIG. 3B, signal source 60 applies a pulse from time *t1* to shortly before t3 time. Thus, the pulse applied by source 56, which extends from *t1* to *t6* time, is effective to cause winding 42 to be energized only from time *t1* to shortly before time *t3*. As before explained, the amplitude of the signal applied to winding 42 is such that it must be maintained for approximately four and one-half time intervals to switch the flux in all of the five flux paths 40*a* through 40*e*. Where, as here, the signal applied to winding is cut off before *t3* time, only the inner flux paths 40*a* and 40*b* are completely switched. Upon termination of the input signal the paths 40*a* and 40*b* assume remanent conditions in the counterclockwise direction whereas paths 40*c*, 40*d* and 40*e* assume remanent conditions in the clockwise direction. It has been pointed out with reference to FIGS. 2, 2A and 2B that quantified constant current or constant voltage pulses may be utilized to completely switch only portions of the core material and for this reason the pulse diagram of FIG. 3B may be considered to be illustrative of both constant current and constant voltage operation.

When with core 40 in this condition, that is, with paths 40*a* and 40*b* at remanence in the counterclockwise direction and paths 40*c*, 40*d* and 40*e* at remanence in the clockwise direction, the pulse applied by signal source 70 to winding 44 is of the proper polarity to reverse the flux in only the inner paths 10*a* and 10*b*. As a result, as is indicated by the full line representation of FIG. 3B only two output pulses are manifested at terminal 54. The full line representations of this figure also indicate the outputs developed at terminal 76 for the three possible settings of switch 86. With switch 86 in either the A or C positions, gate 74 is opened during the first two time intervals and both pulses developed at terminal 54 are passed through the gate to terminal 76. Since winding 82 embraces only the outer position of core 40, which is not switched, neither of the output pulses developed at terminal 54 is transmitted to terminal 76 when switch 86 is in the B position.

When the control switch 58 is initially transferred to contact a terminal 92, gate 55 is placed under the control of signal source 64. As shown in FIG. 3B this signal source supplies a signal which extends for almost four time intervals and allows an energizing pulse to be supplied to winding 42 through gate 55 during this time. The pulse timings, with switch 58 in this condition contacting terminal 92, are illustrated by the dotted portions of the diagram of FIG. 3B. An energizing signal of the magnitude applied by source 56 through gate 55 during this time interval is effective to switch the flux direction in all of the flux paths but the extreme outer path 10*e*. Thus, when signal source 70 is subsequently energized, four output pulses are developed at terminal 54. With switch 86 in the A position, all four of these pulses appear at terminal 76. With switch 86 in the C position, only the first three pulses appear at terminal 76 and with switch 86 in the B position, only the fourth one of these pulses appears at terminal 76.

From the description above, it is obvious that by positioning "gating" windings such as windings 80, 82 and 84 to embrace selected portions of the core, and by applying quantified pulses to initially reverse the direction of flux in only selected ones of a plurality of flux paths individually embraced by output windings, the application of a single reset or drive pulse can be effective to produce any number of successive discrete output pulses which may be so gated under control of the "gating" windings that only pulses or combinations of pulses developed during certain time intervals appear at predetermined output terminals. Further, it should be noted that, as explained in conjunction with FIGS. 2, 2A and 2B, the number of output pulses produced upon the application of a drive pulse to the core may be controlled by quantifying the drive pulse so that only certain portions of the core are switched. Where such an application is desired, the signal source, designated by the box 70 in FIG. 3, may be considered as including gating means such as are shown in the circuitry for energizing winding 42.

Figure 4:
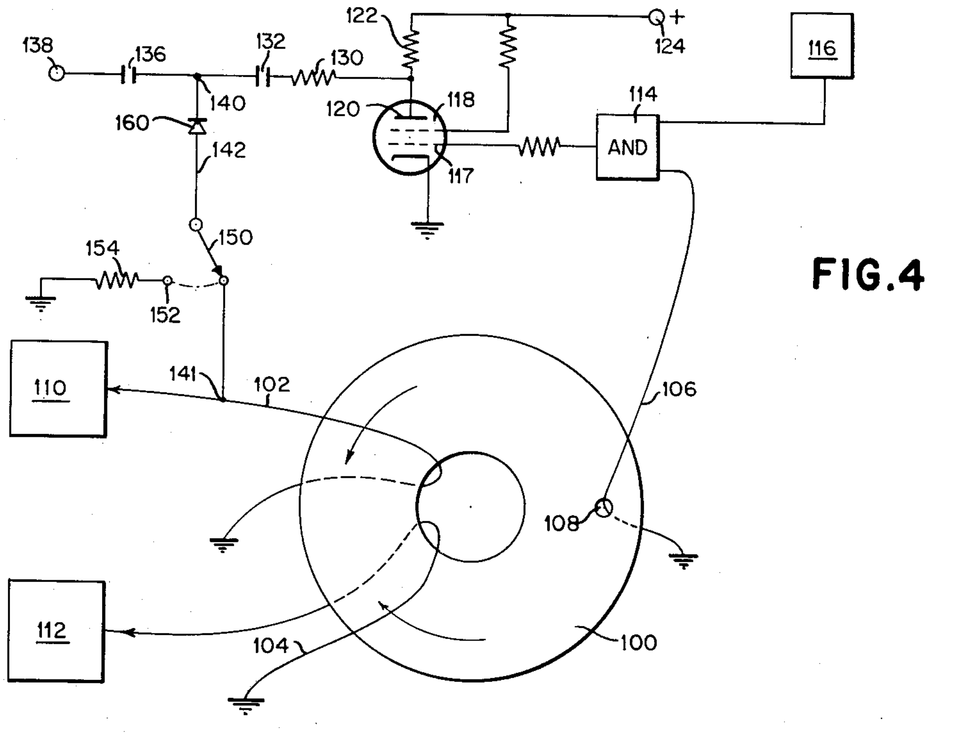
FIG. 4 shows diagrammatically a pulse delay circuit constructed in accordance with the principles of the present invention.
Figure 4A:
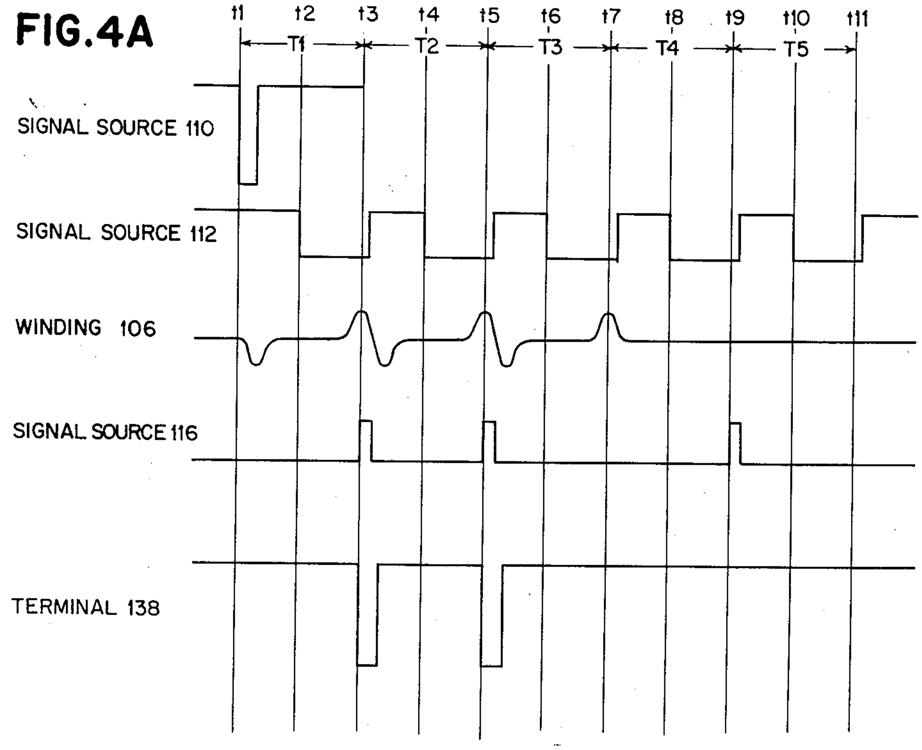
FIG. 4A is a timing diagram for the circuit of FIG. 4.

FIG. 4 shows a delay circuit constructed in accordance with the principles of the invention. The circuit utilizes as a switching and delay element a core 100 of magnetic material. Two drive windings 102 and 104 embrace the entire cross section of the core and an output winding 106 is positioned through an opening 108 to embrace only the outermost portion of the core material. Inputs to the delay circuit are applied by a signal source 110 which is effective to apply to winding 102 a pulse of a polarity to cause current to flow in the direction indicated by the arrow on that winding. Referring to FIG. 4A, a pulse applied by signal source 110 to winding 102 is shown to extend for approximately half the time increment from *t1* to *t2*. The magnitude of the pulse applied is such that it is effective to switch the direction of flux in the entire core. The flux throughout the entire core is in the counterclockwise direction at *t2* time, at which time clock pulse source 112 is effective to apply to winding 104 a pulse of a polarity to cause current to flow in the direction indicated by the arrow on that winding and thereby cause the core material to be subjected to a clockwise magnetomotive force. The pulse applied to winding 104 is just sufficient to be effective to switch the entire core in the time which it is applied. As shown in FIG. 4A, the pulse applied by source 112 is maintained from *t2* to shortly after *t3* time and, thus, the outer portion of core 100, which is embraced by output winding 106, begins to be switched shortly before *t3* time and switching is completed shortly after *t3* time.

As a result of the application of a pulse by source 112 to winding 104 at time *t2*, a pulse is developed on winding 106 shortly before *t3* time. Winding 106 is connected as one input to a gating circuit in the form of an AND circuit designated 114, the other input of which is in the form of a pulse which, as is indicated in FIG. 4A, is applied by a controllable clock pulse source 116 at *t3* time. The output of the AND circuit 114 is connected to the control grid 117 of a thyratron 118. The plate 120 of thyratron 118 is connected through a resistor 122 to a positive source of potential at terminal 124. The potential at terminal 124 and ohmic value of resistor 122 is such that, when thyratron 118 is fired and current is caused to flow in the plate circuit, the potential at plate 120 falls below that which is necessary to sustain the ionization in the thyratron. However, a further temporary current path is provided to maintain thyratron 118 conductive for a predetermined period of time. This path comprises a resistor 130, and a capacitor 132 which has one of its electrodes connected through winding 102 to ground. When thyratron 118 is in the off condition, previous to the application of a pulse by AND circuit 114 to grid 117, the capacitor 132 is charged to the potential of terminal 124. The ohmic value of resistor 130 is appreciably less than that of resistor 122 so that when a pulse is applied to grid 117 at *t3* time to thereby cause the thyratron 118 to conduct, the capacitor 132 in discharging through the resistor 130 is effective to maintain the potential at plate 120 above the sustaining voltage necessary to maintain thyratron 118 conductive. The length of time during which capacitor 132 is effective to maintain the thyratron conductive is dependent upon the potential at terminal 124, the value of resistance 130 and the capacitance of the capacitor itself. In the embodiment of FIG. 4, the design is such that a pulse, such as that shown in FIG. 4A, is transmitted through a capacitor 136 to an output terminal 138. If we consider that a unit time interval comprises two of the time increments shown in FIG. 4A, that is, that the first time interval, which is designated T1, consists of the two successive time increments $t1$ to $t2$, and $t2$ to $t3$, and that the next time interval, designated T2, comprises time increments $t3$ to $t4$ and $t4$ to $t5$, it may be seen that the pulse manifested at output terminal 138 is a duplicate of the input pulse originally applied to winding 102 and is delayed one time interval.

A junction 140 between capacitors 132 and 136 is connected by a lead 142 to winding 102 which winding serves as the output impedance across which the output manifested at terminal 138 is developed. As a result, the pulse developed at $t3$ time, when thyratron 118 is rendered conductive, causes current flow in the direction indicated by the arrow on lead 142 and thereby causes core 100 to be subjected to a counterclockwise magnetomotive force. The pulse, being similar to that originally applied by source 110, is effective to switch the flux direction in the entire core so that, at $t4$ time, the flux throughout the core is oriented in the counterclockwise direction. The quantified clock pulse applied by signal source 112 at $t4$ time then switches the flux core back to the clockwise direction causing an output to be developed on winding 106 at $t5$ time. Since, as shown in FIG. 4A, a signal source 116 is again controlled to apply a pulse at this time to AND circuit 114, thyratron 118 is again rendered conductive and a second pulse is manifested at output terminal 138. This pulse is again effective to reverse the flux direction in the entire core back to the counterclockwise direction and cause an output pulse to be developed at winding 106 when the clock pulse is applied to winding 104 by signal source 112. However, since, as shown in FIG. 4A, clock pulse source 116 is not controlled to apply a pulse at $t7$ time to AND circuit 114, thyratron 118 is not rendered conductive and the circulation of the information in the delay circuit is ended. It should be noted that the negative pulse originally applied by signal source 110 to winding 136 does not cause any appreciable output to be developed at terminal 138 because of the presence of a diode 160 connected between switch 150 and junction 140. Further note should be made of the fact that the circuitry connecting winding 106 and 102 is effectively unidirectional. Thus, a pulse developed on winding 106 of a polarity to render tube 118 conductive is effective to cause an energizing current to flow in winding 102, whereas pulses of either polarity applied to or developed on winding 102 are not transmitted through this circuitry to cause current to flow in winding 106.

From the above description it is evident that the circuit of FIG. 4A is capable, when an input information pulse is applied to winding 102 during a first time interval, of producing a delayed output pulse during the next succeeding time interval. It is also possible to circulate the information originally applied in the form of the input information signal indefinitely and produce output pulses during each of a plurality of succeding time intervals. Where it is not desired to circulate the input information, but merely to provide a circuit capable of receiving input information pulses during successive time intervals and simultaneously producing an output pulse delayed one time interval in response to each input pulse, it is only necessary to transfer a switch 150 to contact a terminal 152 and thereby prevent the output of thyratron 118 from being fed back to the winding 102. With the switch 150 in this condition, the outputs appearing at terminal 138 are developed across a resistor 154 and inputs may be applied to winding 102 during each of a plurality of successive time intervals without interfering with outputs being coincidently developed as the result of the application of an input pulse during the preceding time interval. Where the circuit is operated in this manner, clock pulse source 116 is controlled to apply a signal to AND circuit 114 during each time interval to thereby render each pulse developed on winding 106 effective to cause thyratron 118 to be rendered conductive and an output pulse to be transmitted to terminal 138.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a magnetic circuit, a magnetic element comprising first and second groups of parallel magnetic flux paths, each of said paths being capable of being caused to assume first and second stable states of flux remanence, a winding embracing said element for causing flux changes in said flux paths, a first plurality of output windings each individually embracing one of said parallel flux paths in said first group, a second plurality of output windings each embracing one of said parallel flux paths in said second group, and a further output winding embracing flux paths in both of said groups.

2. In a magnetic circuit, a magnetic element comprising first and second groups of parallel magnetic flux paths, each of said paths being capable of being caused to assume first and second stable states of flux remanence, a winding embracing said element for causing flux changes in said flux paths, a first plurality of output windings each individually embracing one of said parallel flux paths in said first group, a second plurality of output windings each individually embracing one of said parallel flux paths in said second group, and further output winding means embracing at least two flux paths in said second group.

3. In a magnetic circuit, a magnetic element comprising a plurality of parallel magnetic flux paths of unequal length, each of said paths being capable of being caused to assume one or the other of two different stable states of flux remanence in opposite directions, a single winding embracing said element and effective when energized to apply a magnetomotive force effective to reverse the flux in each of said paths in succession first and second output windings each embracing one of said flux paths only, and a third output winding embracing at least two of said flux paths.

4. In a magnetic circuit, a magnetic element comprising a plurality of parallel magnetic flux paths of unequal length, each of said paths being capable of being caused to assume first and second stable states of flux remanence in first and second directions and each normally in a stable state in the same direction, a plurality of output windings each individually embracing one of said paths, winding means embracing said element for reversing the direction of flux in said paths in succession to thereby cause a discrete output pulse to be produced on each of said output windings, and means for controlling the output pulses developed on said output windings comprising a further winding embracing at least one of said flux paths.

5. In a magnetic circuit, a magnetic element comprising a plurality of parallel magnetic flux paths, each of said paths being capable of being caused to assume first and second stable states of flux remanence, a plurality of output windings each embracing one of said flux paths, winding means embracing said element, means for energizing said winding means to reverse the direction of flux in at least a first one of said flux paths and thereby cause an output pulse to be developed at least on the winding embracing said first flux path, and means for gating outputs developed on said windings comprising a further winding embracing a portion of said element including at least said first flux path.

6. In a magnetic circuit, a magnetic element comprising a plurality of parallel magnetic flux paths, each of said parallel paths after a first of said paths having a longer magnetic length one to another successively and each of said paths being capable of being caused to assume at least first and second stable states of flux remanence, a plurality of output windings each embracing one of said flux paths, winding means embracing at least a portion of said element, means for energizing said winding means to reverse the direction of flux in at least some of said flux paths in succession to thereby produce a discrete output pulse on at least some of said output windings, and means for gating outputs developed on said windings comprising a further winding embracing at least one of said flux paths.

7. In a magnetic circuit, a plurality of magnetic concentrically parallel flux paths, each of said paths being capable of being caused to assume at least first and second stable states of flux remanence, a plurality of output windings each individually embracing one of said flux paths, winding means embracing said element for reversing the direction of flux in a different one of said flux paths during each of a plurality of successive time intervals to thereby cause a pulse to be developed each time interval on that output winding which embraces the flux path in which the direction of flux is then reversed, and means for gating said pulses produced on said output windings comprising further winding means embracing at least one of said flux paths.

8. In a magnetic circuit, a plurality of magnetic flux paths, each of said paths being capable of being caused to assume first and second stable states of flux remanence, winding means for simultaneously applying to all of said paths a magnetomotive force effective to reverse the direction of flux in each of said paths in succession, a plurality of output windings each embracing one of said paths and each effective to develop an output when the flux in the path embraced is reversed, a controllable gating circuit, means applying the outputs developed on said output windings to said gating circuit, and a further winding embracing at least one of said flux paths for controlling said gating circuit.

9. In a magnetic circuit, a magnetic element in the form of a toroidal core capable of being caused to assume first and second stable states of flux remanence, a plurality of openings in said core dividing said core into at least first, second and third parallel circumferentially extending flux paths of unequal length, a first winding embracing said first flux path only, a second winding embracing said second flux path only, a third winding embracing said third flux path only, a fourth winding embracing at least two of said flux paths, and a fifth winding for producing flux changes in all of said flux paths.

10. In a magnetic circuit, a core of magnetic material capable of assuming first and second stable states of remanent polarization in opposite directions having an opening therethrough dividing said core into first and second circumferentially extending parallel flux paths, said second flux path having a greater flux path length than said first flux path, a first winding embracing said core and effective when energized to produce flux changes in said paths in a first direction, a second winding embracing said core for producing flux changes in said paths in a second direction, an output winding embracing only said second path effective to develop output pulses in response to flux changes in said second direction in said second path, and means responsive to said pulses developed on said output winding for energizing said first input winding.

11. In a magnetic circuit, a core of magnetic material capable of assuming first and second stable states of remanent polarization in opposite directions having an opening therethrough dividing said core into first and second circumferentially extending flux paths, the flux in each of said paths being capable of being oriented in first and second opposite directions, a first winding embracing said core and effective when energized when the flux in said paths is oriented in said first direction to reverse the direction of flux orientation in said paths, a second winding embracing the one of said paths having the greater flux path length for developing an output pulse when the flux in that path is reversed from said first to said second direction, a third winding as embracing said core and effective when energized to orient the flux in said paths in said first direction, and means connecting said second and third windings for energizing said third winding in response to said output pulses developed on said second winding.

12. In a magnetic circuit, a core of magnetic material capable of assuming first and second stable states of remanent polarization in opposite directions, a first winding embracing said core, means applying a signal to said first winding effective to reverse the direction of flux in said core, an output winding embracing a portion of said core for developing an output when the flux in the embraced portion is reversed, a second input winding on said core, and means connecting said second input winding and said output winding.

13. The invention as claimed in claim 12 wherein said means connecting said second input winding and said output winding comprise unidirectional current flow means.

14. In a magnetic circuit, a core of magnetic material having an opening therethrough dividing said material into first and second circumferentially extending flux paths, each of said paths being capable of assuming at least first and second stable states of remanent magnetization in first and second directions and each in said first state, a first input winding embracing said core for applying thereto a magnetomotive force in a direction to switch the flux in each of said paths, an output winding embracing said second flux path only for developing an output pulse only when the flux in said second path is switched, and means coupled to said output winding and responsive to said pulse developed thereon for causing further magnetomotive force to be applied to said core.

15. The invention as claimed in claim 14 wherein said second flux path has a greater flux path length than said first flux path.

16. The invention as claimed in claim 14 wherein said means coupled to said output winding includes a second input winding embracing at least a portion of said core.

17. The invention as claimed in claim 16 wherein said second input winding is effective in response to a pulse developed on said output winding to apply to said core a magnetomotive force in a direction opposite to the direction of the magnetomotive force applied by said first input winding.

18. The invention as claimed in claim 16 wherein said means coupled to said output winding includes a grid controlled tube, said output winding being connected to the grid of said tube and said second input winding being connected to the plate of said tube.

19. In a magnetic circuit, a core of magnetic material having an opening therethrough dividing said material into two parallel flux paths, each of said paths being capable of assuming at least first and second stable states of remanent magnetization in first and second directions and each in said first state, a first winding embracing said core for producing flux changes in at least one of said flux paths, a second winding embracing only one of said flux paths, and means coupling said second winding to said first winding.

20. In a magnetic circuit; a core of magnetic material having a central opening therethrough and a further opening radially disposed in said material from said central opening; said further opening dividing the core into first and second concentrically parallel extending flux paths of unequal length; each of said flux paths being capable of assuming a first stable state with the flux therein oriented in a first direction and a second stable state with the flux therein oriented in a second direction and each being in said first stable state; first and second windings embracing said core; means coupled to said windings for applying a first signal to said first winding during a first time interval and a second signal to said second winding during a second time interval; the magnitude and direction of said first signal being sufficient to render said first winding effective during said first time interval to cause both of said paths to assume said second stable state; the magnitude and direction of said second signal being sufficient to render said second winding effective to cause both of said paths to assume said first stable state by sequentially reversing the direction of the flux in said first and second paths from said second direction to said first direction with the flux in the one of said paths having the shorter flux path length being reversed during a first portion of said second time interval and the flux in the one of said paths having the greater flux length being reversed at a latter portion of said second time interval; an output winding positioned through said further opening to embrace the one of said flux paths having the greater flux path length for producing an output when the flux is reversed in that path during said latter portion of said second time interval; a gate circuit; said output winding being connected to said gate circuit for applying the output produced on said output winding during the latter portion of said second time interval to said gate circuit; and further means coupled to said gate circuit for applying a gating signal thereto during said latter portion of said second time interval.

21. In a magnetic circuit; a magnetic core element; winding means for producing flux changes in said core element; a gating circuit; a plurality of output windings each embracing a portion of said element and each connected to said gating circuit for applying discrete signal inputs to said gating circuit in response to said flux changes in said core; and a further output winding embracing a portion of said element and coupled to said gating circuit for applying control signals to said gating circuit in response to said flux changes in said core.

22. A magnetic core circuit comprising a core of magnetic material having at least first, second and third openings therein dividing said core into first, second and third circumferentially extending flux paths of unequal length; each of said paths being capable of assuming first and second stable states of flux remanence; an input winding embracing at least a portion of said core; first, second and third output windings each positioned through at least one of said openings to embrace a corresponding one only of said first, second and third flux paths; means for applying to said input winding a pulse sufficient to reverse the flux in said first, second and third flux paths in succession; whereby output signals are manifested on said first, second and third output windings in succession.

23. A magnetic core circuit comprising a core of magnetic material having at least first, second and third openings therein dividing said core into said first, second and third circumferentially extending flux paths of unequal length; each of said paths being capable of assuming first and second stable states of flux remanence; an input winding embracing at least a portion of said core; first, second and third output windings each positioned through at least one of said openings to embrace a corresponding one only of said first, second and third flux paths; an output terminal; each of said output windings being coupled to said output terminal; and means applying to said input winding a pulse of a magnitude sufficient to reverse the flux in said first, second and third flux paths in succession; whereby successive output signals are manifested at said output terminal.

24. A magnetic core circuit comprising a core of magnetic material having at least first, second and third openings therein dividing said core into first, second and third circumferentially extending flux paths of unequal length; each of said paths being capable of assuming first and second stable states of flux remanence; an input winding embracing at least a portion of said core; first, second and third output windings each positioned through at least one of said openings to embrace a corresponding one only of said first, second and third flux paths; a gating circuit; each of said output windings being coupled to an input for said gating circuit; means applying to said input winding a pulse sufficient to reverse the flux in said first, second and third flux paths, in succession; whereby successive inputs are applied to the input of said gating circuit; and further output winding means embracing at least a portion of said core including one or more of said flux paths and coupled to said gating circuit for applying gating signals thereto.

25. A magnetic core circuit comprising a core of magnetic material having at least first, second and third openings therein dividing said core into first, second and third circumferentially extending flux paths of unequal length; each of said paths being capable of assuming first and second stable states of flux remanence; an input winding embracing at least a portion of said core; means coupled to said input winding for selectively applying thereto either an input pulse of a first duration or an input pulse of a second duration; said input winding being effective when an input pulse of said first duration is applied thereto to reverse the flux in said first, second and third flux paths in succession, and effective when an input pulse of said second duration is applied thereto to reverse the flux in said first and second flux paths only in succession; first, second and third output windings each positioned through one of said openings to embrace a corresponding one only of said flux paths; an output terminal; and means connecting said first, second and third windings to said output terminal; whereby a plurality of output pulses is produced at said output terminal, the number of which depends upon whether a pulse of said first duration or a pulse of said second duration is applied to said input winding.

26. In a magnetic circuit, a core of magnetic material capable of assuming first and second stable states of remanent polarization in opposite directions, a winding inductively associated with said core for orienting magnetic flux in said element, signal applying means normally effective to cause current flow in said winding for an increment of time of one duration but controllable to be effective to cause current flow in said winding for an increment of time of different duration, a plurality of openings in said core material dividing said core material into a plurality of circumferentially extending paths, and a plurality of output windings each individually embracing one of said paths.

References Cited in the file of this patent

UNITED STATES PATENTS

| | | |
|---|---|---|
| 2,805,408 | Hamilton | Sept. 3, 1957 |
| 2,805,409 | Mader | Sept. 3, 1957 |
| 2,818,555 | Lo | Dec. 31, 1957 |
| 2,870,433 | Simpson | Jan. 20, 1959 |

OTHER REFERENCES

Proceedings of the IRE, March 1956, article entitled "The Transfluxor," by J. A. Rajchman and A. W. Lo, pp. 321–332.